June 8, 1954
A. R. WHITE ET AL
2,680,387
CRANKSHAFT
Filed May 22, 1951
2 Sheets-Sheet 1
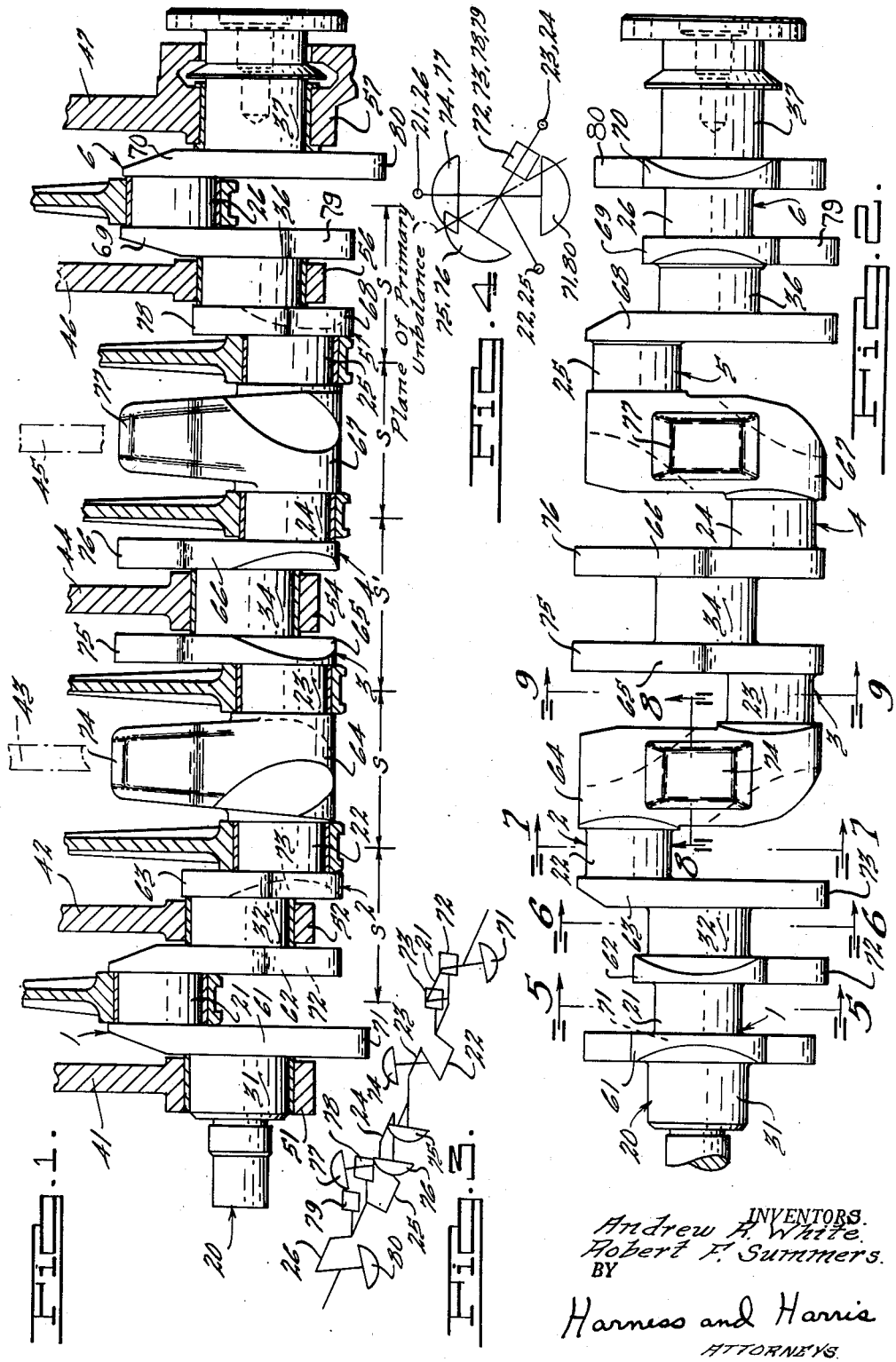
INVENTORS.
Andrew R. White.
Robert F. Summers.
BY
Harness and Harris
ATTORNEYS.

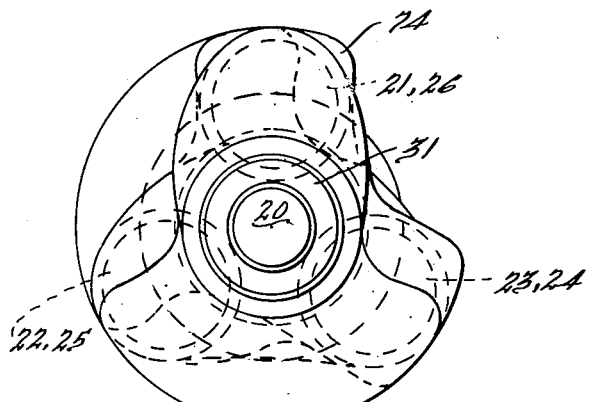
Fig. 10.
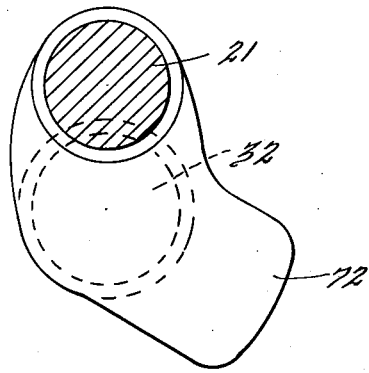
Fig. 5.
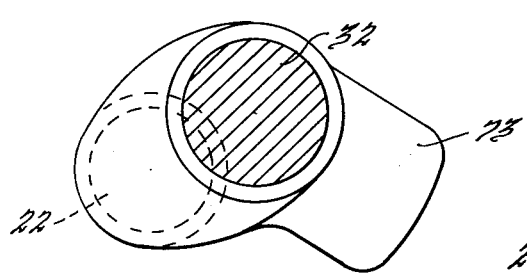
Fig. 6.
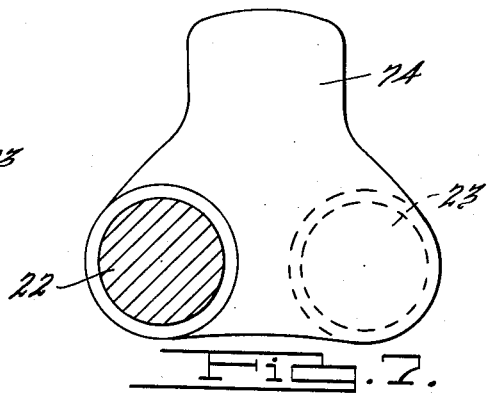
Fig. 7.
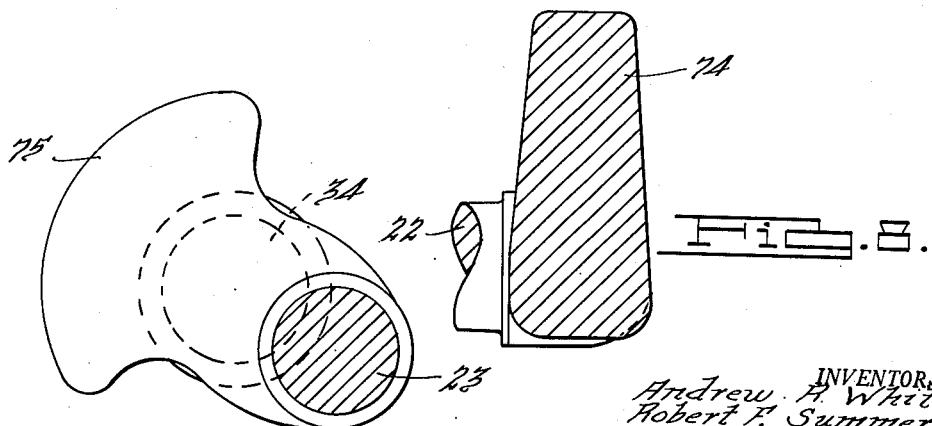
Fig. 8.
Fig. 9.
INVENTORS.
Andrew H. White.
Robert F. Summers.
BY
Harness and Harris
ATTORNEYS.

Patented June 8, 1954

2,680,387

UNITED STATES PATENT OFFICE 2,680,387

CRANKSHAFT

Andrew R. White, Birmingham, and Robert F. Summers, Highland Park, Mich., assignors to Chrysler Corporation, Highland Park, Mich., a corporation of Delaware Application May 22, 1951, Serial No. 227,557

14 Claims. (Cl. 74—603)

This invention relates to a five-main-bearing crankshaft for a six cylinder in-line engine and to a novel manner of supporting the crankshaft in the engine cylinder block such that reduced crankshaft bending and bearing loads are achieved while utilizing a minimum number of crankshaft main bearings to secure the improved results.

It is a primary object of this invention to provide a balanced six throw crankshaft for a six cylinder in-line engine having five main bearing portions arranged in such a manner that the crankshaft bending and bearing loads are substantially equal to those that result when a seven-main-bearing supported, six throw, crankshaft of similar construction is utilized.

It is another object of this invention to provide a six cylinder in-line engine with a crankshaft having the crank throws and the main bearings arranged in such a manner that the shaft resistance to deflection and the shaft bearing loads are of the most favorable magnitude with the minimum number of bearings. The disclosed arrangement permits the elimination of certain main bearings and associated engine parts heretofore considered necessary to achieve equivalent results.

It is another object of this invention to provide a six throw, five-main-bearing crankshaft for a six cylinder in-line engine having the crank throws and main bearings arranged to provide performance substantially equivalent to a similar seven bearing shaft. This five bearing shaft is such that two additional main bearing portions could be easily and economically added to the crankshaft to convert it to a seven-main bearing crankshaft in the event increased engine compression ratios, engines loads, and engine speeds should necessitate a conversion to the seven-main-bearing support for the shaft.

It is still another object of this invention to provide a five-main-bearing, six crank throw, crankshaft for a six cylinder in-line engine having counterweights arranged in such a manner with respect to the crankshaft bearings and crank throws that maximum shaft performance is achieved at minimum cost.

It is a still further object of this invention to provide a five-main-bearing crankshaft for a six cylinder in-line engine that is easy and economical to manufacture, statically and dynamically balanced to give maximum performance and a shaft that can be utilized with the conventional six-cylinder, seven-main-bearing, in-line engine block without necessitating any major changes in the block.

Other objects and advantages of this invention will appear from a reading of the attached specification and study of the related drawings wherein:

Fig. 1 is a sectional side elevational view of the crankshaft embodying this invention, which shaft is shown journaled in the bearing supporting bulkheads of an associated engine cylinder block;

Fig. 2 is a top plan view of the crankshaft shown in Fig. 1;

Fig. 3 is a diagrammatic perspective view of the crankshaft shown in Fig. 2;

Fig. 4 is a diagrammatic end elevational view of the crankshaft shown in Figs. 2 and 3;

Fig. 5 is a sectional elevational view taken across the No. 1 crank throw as indicated by the line 5—5 of Fig. 2;

Fig. 6 is a sectional elevational view taken across an intermediately disposed bearing between crank throws Nos. 1 and 2 as indicated by the line 6—6 of Fig. 2;

Fig. 7 is a sectional elevational view taken across the No. 2 crank throw as indicated by the line 7—7 of Fig. 2;

Fig. 8 is a sectional elevational view taken across the kidney and cheek between crank throws Nos. 2 and 3 as indicated by the line 8—8 of Fig. 2;

Fig. 9 is a sectional elevational view taken across the No. 3 crank throw as indicated by the line 9—9 of Fig. 2; and Fig. 10 is an end elevational view of the crankshaft shown in Fig. 2.

The accompanying drawings show a five-main-bearing crankshaft 20 for use in a conventional six-cylinder in-line engine, the shaft having six, axially spaced, crank throws. Main bearings 31, 32 and 36, 37 are placed at each end of the No. 1 and No. 6 crank throws respectively and a center main bearing 34 is used between the No. 3 and No. 4 crank throws.

This five-main-bearing crankshaft has practically all the important advantages of a seven-main-bearing crankshaft and offers a less expensive construction in that it uses only five main bearings. The close spacing of the main bearings 31, 32 and 36, 37 at the ends of the crankshaft has the advantage of reducing lateral deflection of the crankshaft with firing of the end cylinders. Two known types of objectionable vibration can thus be minimized in this crankshaft arrangement. These are (1) crankshaft-flywheel deflection "bump" which is known to be excited by the firing of the end cylinder adjacent to the fly-wheel, and (2) crankshaft "rap" at intermediate speeds, which has been found in existing engines to be affected most by the firing of the end cylinders.

An economic advantage in the adoption of this five-main-bearing crankshaft arrangement is the similarity of load distribution between corresponding bearings of this five-bearing shaft and existing seven-bearing crankshaft. This similarity permits identical cylinder spacing with either crankshaft and, therefore, a change in the number of bearings from five to seven can be accomplished without changing the expensive tooling for the engine cylinder block, cylinder heads, etc. Only the crankshaft tooling needs be changed if increased engine loads or speeds or compression ratios do eventually require a seven-main-bearing crankshaft for the six cylinder in-line engine.

Considering the crankshaft 20 in detail now, it will be noted that the shaft comprises six, axially spaced apart, crank throws denoted 1-6 respectively. The six crank throws are arranged as three pairs of aligned cranks symmetrically spaced about the crankshaft axis with 120° between each of the several aligned pairs of cranks (see Fig. 4). Each crank throw includes an axially extending crank pin element designated 21-26 respectively and a pair of radially extending cheek portions which are connected to opposite ends of each crank pin. The cheek portions for the several crank throws have been designated 61-70 respectively. Located between and connecting the several crank throws are the five main bearings denoted respectively 31, 32, 34, 36 and 37. Crank throw No. 2 is directly connected to crank throw No. 3 by the enlarged cheek portion 64 that includes the kidney counterweight 74 that will be described subsequently. In similar fashion crank throw No. 4 is directly connected to crank throw No. 5 by the enlarged cheek portion 67 that mounts the kidney counterweight 77 that is also described subsequently.

The five main bearing portions 31, 32, 34, 36 and 37 are adapted to be journaled in the axially spaced bulkhead portions 41, 42, 44, 46 and 47 of the engine cylinder block. Bearing caps 51, 52, 54, 56 and 57, that are detachably connected to the bulkheads 41, 42, 44, 46 and 47 respectively, are utilized to hold the crankshaft in assembled position in the engine cylinder block bearing journals.

It will be noted that the cylinder spacing axially of the shaft 20 is the same between cylinders 1 and 2, 2 and 3, 4 and 5, and 5 and 6. This equal spacing is indicated by the letter s in Fig. 1. The spacing between the centrally disposed cylinders 3 and 4 is slightly greater than that existing between the other cylinders of the engine and this increased axial dimension has been designated s'. The increased axial dimension s' thus provides area for an enlarged, centrally disposed, main bearing 34. As the crankshaft loading or stressing is greatest at the central portion of the shaft the increased axial length of the centrally disposed main bearing 34 provides a means for reducing and maintaining more or less uniform unit loads on all bearings of the crankshaft and thus no one bearing is required to take any abnormal loading that might reduce its life.

It will be noted that in the crankshaft arrangement disclosed, the bearings that would normally be placed between crank throws 2 and 3 and crank throws 4 and 5 in a seven-main bearing shaft have been omitted. In the place of these two omitted bearings enlarged cheeks 64 and 67 respectively have been formed. These enlarged cheeks 64 and 67 each include a kidney counterweight 74 and 77 respectively. The counterweights 74 and 77 extend in the plane of the number 1 and number 6 crank throws as will be more fully described subsequently. In the event an engine of the design herein disclosed is using a five-main-bearing crankshaft, and engine speeds or loads or compression ratios necessitate a change to a seven-main bearing shaft, then only the crankshaft tooling would require any major alterations. It has been found that the required cylinder spacing for a six cylinder, in-line engine would be the same for either a five or a seven main bearing shaft. Accordingly, to convert the five bearing shaft to a seven bearing shaft the two additional bearing supporting bulkheads 43 and 45 (see broken lines in Fig. 1) could be easily and economically added to the engine cylinder block. The enlarged cheeks 64 and 67 of the five-main-bearing crankshaft would each be changed to main bearings with counterweight portions formed along the crank throw cheeks in the event this five-main-bearing crankshaft design was to be changed to a seven-main-bearing shaft.

Figs. 3 and 4 clearly disclose one of the types of counterweighting that may be utilized with a five-main-bearing crankshaft embodying this invention. The disclosed type of counterweighting is known as the two-plane system due to the fact that all of the counterweights are arranged to extend radially from the crankshaft axis in one or the other of two well defined planes. These two planes are defined by the number 1 and 6 crank throws and the number 3 and 4 crank throws. In each of these two planes there are counterweights on opposite sides of the crankshaft axis and the overall arrangement is such that the crankshaft is both statically and dynamically balanced and shaped so as to reduce crankshaft bending and bearing loads. It has been found that the disclosed two-plane counterbalancing system provides about the best overall arrangement to keep the crankshaft bending and bearing loads to a minimum. It was also found that with this six-throw, five-main-bearing, two-plane counterweighted crankshaft, it was advantageous to position the larger counterweights between the centrally and intermediately disposed bearings 32, 34 and 36 rather than at the end bearings 31 and 37. While the two-plane counterweight system disclosed is quite advantageous for use with this five-main-bearing, six throw crankshaft, still, the basic bearing arrangement features of this crankshaft may be utilized with any system of counterweighting whether it be a one plane, two-plane, or multiple plane system or variations and/or combinations thereof.

With the crankshaft bearing arrangement herein disclosed it will be noted that there are a pair of bearings at each end of the shaft arranged on opposite sides of the end crank throws to thereby provide the maximum support at the locations where it is most needed and most beneficial. This end support of the crankshaft by pairs of closely spaced main bearings is the reason a shaft of this design is not subject to the objectionable crankshaft-flywheel deflection "bump" and the crankshaft "rap" which vibrations are known to be excited by the firing of the end cylinders of the engine. In six throw crankshafts supported by three (3) or four (4) main bearings, there is no bearing support on opposite sides of each end crank throw and thus the abovementioned objectionable vibrations are prevalent. In order to overcome the noted vibrations in six throw crankshafts seven main bearings have been utilized wherein a bearing is placed between every crank throw and at each end of the shaft. The seven-main-bearing shaft is a considerably more expensive construction than the five-main-bearing shaft herein disclosed and it has been found that the seven-main bearing shaft accomplishes very little improvement over the five-main-bearing construction. In addition to the increased cost, a seven-main-bearing construction adds increased friction losses to the six cylinder engine and thus lowers the engine operating efficiency. A table is set forth below that graphically brings out the advantages of the disclosed five (5) main bearing crankshaft arrangement over known four (4) and seven (7) main bearing six throw shafts.

| No. of Bearings | Relative Crankshaft Deflection | Percent Cost Penalty |
| --- | --- | --- |
| 7 | 100 | 6 |
| 5 | 109 | 3 |
| 4 | 258 | 0 |

From the above table it is thought to be obvious that there is an unexpected and abnormally high improvement in resistance to crankshaft deflection by the addition of a single bearing to a four bearing, six throw crankshaft and also there is a major cost saving by elimination of a pair of bearing elements from the known seven bearing arrangement without any sort of expected or corresponding reduction in the resistance to crankshaft deflection.

We claim:

1. In a six cylinder in-line engine, a six throw crankshaft having only five, throw spaced, crankshaft bearing portions, said five bearing portions being arranged such that a bearing portion is located outboard of each end crank throw and the remaining three bearing portions are each located between a pair of intermediate crank throws and arranged to provide a bearing on the inboard side of each end crank throw.

2. In a six cylinder in-line engine, a six throw crankshaft having only five, throw spaced, crankshaft bearing portions, said five bearing portions being arranged such that a bearing portion is located on each side of each end crank throw and the remaining bearing portion intermediate the pair of centrally located crank throws.

3. In a six cylinder in-line engine, a six throw crankshaft having only five, throw spaced, crankshaft bearing portions, said five bearing portions being arranged such that a bearing portion is located on each side of each end crank throw and the remaining bearing portion intermediate the pair of centrally located crank throws, and engine supported crankshaft journals engaged with said bearing portions.

4. In a six cylinder in-line engine, a six throw crankshaft wherein pairs of axially extending, aligned, crank pins are arranged in radially directed planes spaced 120° from one another, said crankshaft having only five bearing portions that are spaced from each other by intermediately disposed crank throws, said five bearing portions being arranged such that a bearing portion is located outboard of each end crank throw and the remaining three bearing portions are each located between a pair of intermediate crank throws and arranged to provide a bearing on the inboard side of each end crank throw.

5. In a six cylinder in-line engine, a six throw crankshaft wherein pairs of axially extending, aligned, crank pins are arranged in radially directed planes spaced 120° from one another, said crankshaft having only five bearing portions that are spaced from each other by intermediately disposed crank throws, said five bearing portions being arranged such that a bearing portion is located on each side of each end crank throw and the remaining bearing portion intermediate the pair of centrally located crank throws.

6. In a six cylinder in-line engine, a six throw crankshaft wherein pairs of axially extending, aligned, crank pins are arranged in radially directed planes spaced 120° from one another, said crankshaft having only five bearing portions that are spaced from each other by intermediately disposed crank throws, said five bearing portions being arranged such that a bearing portion is located on each side of each end crank throw and the remaining bearing portion intermediate the pair of centrally located crank throws, and engine supported crankshaft journals engaged with said crankshaft bearing portions.

7. In a six cylinder in-line engine, a six throw crankshaft having pairs of throws symmetrically arranged about the crankshaft axis in three radially extending planes spaced 120° apart, one of said planes including the pair of end crank throws, another of said planes including the pair of intermediately disposed crank throws that are axially adjacent the end crank throws, and the other of said planes including the pair of centrally disposed crank throws that are arranged axially between the said pair of intermediately disposed crank throws, said crankshaft having only five bearing portions that are spaced from each other by the crankshaft crank throws, said five bearing portions being arranged such that there is a bearing portion located at each side of each end crank throw and a bearing portion located between the pair of centrally disposed crank throws.

8. In a six cylinder in-line engine, a six throw crankshaft having pairs of throws symmetrically arranged about the crankshaft axis in three radially extending planes spaced 120° apart, one of said planes including the pair of end crank throws, another of said planes including the pair of intermediately disposed crank throws that are axially adjacent the end crank throws, and the other of said planes including a pair of centrally disposed crank throws that are arranged axially between the said pair of intermediately disposed crank throws, said crankshaft having only five bearing portions that are spaced from each other by the crankshaft crank throws, said five bearing portions being arranged such that there is a bearing portion located at each side of each end crank throw and a bearing portion located between the pair of centrally disposed crank throws, and counterbalance weights carried by the crank throws arranged to reduce bearing loads and crankshaft bending.

9. In a six cylinder in-line engine, a six throw crankshaft having pairs of throws symmetrically arranged about the crankshaft axis in three radially extending planes spaced 120° apart, one of said planes including the pair of end crank throws, another of said planes including the pair of intermediately disposed crank throws that are axially adjacent the end crank throws, and the other of said planes including the pair of centrally disposed crank throws that are arranged axially between the said pair of intermediately disposed crank throws, said crankshaft having only five bearing portions that are spaced from each other by the crankshaft crank throws, said five bearing portions being arranged such that there is a bearing portion located at each side of each end crank throw and a bearing portion located between the pair of centrally disposed crank throws, and counterweights carried by the crank throws arranged to reduce bearing loads and crankshaft bending, certain of said counterweights being arranged to extend in certain of the aforementioned planes and including a counterweight located between each intermediately disposed crank throw and each centrally disposed crank throw and extending in the plane of said end crank throws and other said counterweights arranged in planes spaced radially from the plane of the end crank throws.

10. In a six cylinder in-line engine, a six throw crankshaft having pairs of throws symmetrically arranged about the crankshaft axis in three radially extending planes spaced 120° apart, one of said planes including the pair of end crank throws, another of said planes including the pair of intermediately disposed crank throws that are axially adjacent the end crank throws, and the other of said planes including the pair of centrally disposed crank throws that are arranged axially between the said pair of intermediately disposed crank throws, said crankshaft having only five bearing portions that are spaced from each other by the crankshaft crank throws, said five bearing portions being arranged such that there is a bearing portion located at each side of each end crank throw and a bearing portion located between the pair of centrally disposed crank throws, counterweights carried by the crank throws arranged to reduce bearing loads and crankshaft bending, certain of said counterweights being arranged to extend in certain of the aforementioned planes and including a counterweight located between each intermediately disposed crank throw and each centrally disposed crank throw and extending in the plane of said end crank throws, and also including certain other counterweights carried by each of the said end crank throws arranged in the plane of the said end throws and extending in a direction opposite to that of the counterweights that are located between the intermediately disposed and centrally disposed crank throws, and other of said counterweights arranged in planes spaced radially from the plane of the end crank throws.

11. In a six cylinder in-line engine, a six throw crankshaft having pairs of throws symmetrically arranged about the crankshaft axis in three radially extending planes spaced 120° apart, one of said planes including the pair of end crank throws, another of said planes including the pair of intermediately disposed crank throws that are axially adjacent the end crank throws, and the other of said planes including the pair of centrally disposed crank throws that are arranged axially between the said pair of intermediately disposed crank throws, said crankshaft having only five bearing portions that are spaced from each other by the crankshaft crank throws, said five bearing portions being arranged such that there is a bearing portion located at each side of each end crank throw and a bearing portion located between the pair of centrally disposed crank throws, counterweights carried by the crank throws arranged to reduce bearing loads and crankshaft bending, certain of said counterweights being arranged to extend in certain of the aforementioned planes and including a counterweight located between each intermediately disposed crank throw and each centrally disposed crank throw and extending in the plane of said end crank throws, and also including certain other counterweights carried by each of the said end crank throws arranged in the plane of the said end throws and extending to a direction opposite to that of the counterweights that are located between the intermediately disposed and centrally disposed crank throws, and other of said counterweights carried by the intermediately and centrally disposed crank throws disposed in the plane of the centrally disposed crank throws.

12. In a six cylinder in-line engine, a six throw crankshaft having only five, throw spaced, crankshaft bearing portions wherein each end crank throw has a crankshaft bearing at each side thereof while the crank throws intermediate the end crank throws have a pair of crank throws between each adjacent pair of crankshaft bearings.

13. In an internal combustion engine, an engine cylinder block forming a line of six cylinders in laterally spaced parallel relation, a crankshaft having its axis perpendicular to and in the plane formed by the axes of said cylinders, said crankshaft having a crank throw opposite each cylinder, said throws being arranged in three pairs with the throws in each pair being in phase with each other and each pair of throws being 120 degrees out of phase with each of the other pairs, the throws in one of said pairs being disposed opposite the two end cylinders and the throws of the other two pairs being opposite the two innermost and the two intermediate cylinders respectively, and bearings in the crankcase journaling said crankshaft on each side of each end throw and between the two innermost throws.

14. A six throw crankshaft having five main bearing journals arranged one on each side of each end throw and one intermediate the two middle throws.

References Cited in the file of this patent

UNITED STATES PATENTS

| Number | Name | Date |
|---|---|---|
| 884,053 | Trebert | Apr. 7, 1908 |
| 1,223,071 | Holveck | Apr. 17, 1917 |
| 1,534,411 | Potter | Apr. 21, 1925 |
| 1,645,717 | Oldson | Oct. 18, 1927 |
| 1,661,341 | Oldson | Mar. 6, 1928 |
| 1,726,875 | Yassendorf | Sept. 3, 1929 |
| 1,756,659 | Oldson | Apr. 29, 1930 |
| 1,817,389 | Meyer | Aug. 4, 1931 |
| 1,881,027 | Manning | Oct. 4, 1932 |
| 1,901,358 | Ryder | Mar. 14, 1933 |